(12) United States Patent
Babbush et al.

(10) Patent No.: US 10,650,321 B2
(45) Date of Patent: May 12, 2020

(54) QUANTUM PHASE ESTIMATION OF MULTIPLE EIGENVALUES

(71) Applicant: GOOGLE LLC, Mountain View, CA (US)

(72) Inventors: Ryan Babbush, Venice, CA (US); Nan Ding, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/067,428

(22) PCT Filed: Dec. 30, 2015

(86) PCT No.: PCT/US2015/068163
§ 371 (c)(1),
(2) Date: Jun. 29, 2018

(87) PCT Pub. No.: WO2017/116446
PCT Pub. Date: Jul. 6, 2017

(65) Prior Publication Data
US 2019/0019102 A1    Jan. 17, 2019

(51) Int. Cl.
*G06N 10/00*      (2019.01)
*G06F 17/10*      (2006.01)

(52) U.S. Cl.
CPC ............ *G06N 10/00* (2019.01); *G06F 17/10* (2013.01)

(58) Field of Classification Search
CPC ................................ G06F 17/10; G06N 10/00
See application file for complete search history.

(56) References Cited

U.S. PATENT DOCUMENTS

2014/0297708 A1    10/2014   Svore
2018/0137422 A1*   5/2018    Wiebe .................. G06N 3/0445

OTHER PUBLICATIONS

Authorized officer Ralf Abbing, International Search Report/Written Opinion in PCT/US2015/068163 dated Sep. 23, 2016, 15 pages.
Svore Krysta M: "Faster Phase Estimation", Internet Citation, Apr. 2, 2013 (Apr. 2, 2013), pp. 1-14 XP002736091, Retrieved from the Internet: URL:http://arxi v.org/pdf/1304.0741.pdf; [retrieved on Feb. 17, 2015] the whole document.
Liu Xiu-Mei et al: "Experimental Realization of Arbitrary Accuracy Iterative Phase Estimation Algorithms on Ensemble Quantum Computers", Chinese Physics Letters, Institute of Physics Publishing, Bristol, GB, vol. 24, No. 12, Dec. 1, 2007 (Dec. 1, 2007), pp. 3316-3319, XP020127648, ISSN: 0256-307X the whole document.

(Continued)

*Primary Examiner* — Chuong D Ngo
(74) *Attorney, Agent, or Firm* — Fish & Richardson P.C.

(57)    ABSTRACT

Methods, systems, and apparatus for quantum phase estimation. In one aspect, an apparatus includes a quantum circuit comprising: a first quantum register comprising at least one ancilla qubit, a second quantum register comprising one or more qubits, wherein the second quantum register is prepared in a quantum state that is not an eigenstate of a unitary operator operating on the first and second quantum register; and a phase learning system, configured to learn phases of the eigenvalues of the unitary operator.

20 Claims, 3 Drawing Sheets

(56) References Cited

OTHER PUBLICATIONS

Peter Varga and Barnabas Apagyi "Phase estimation procedure to solve quantum-mechanical eigenvalue problems", Physical Review A (Atomic, Molecular, and Optical Physics), American Physical Society, USA, vol. 78, No. 2, Aug. 1, 2008 (Aug. 1, 2008), pp. 22337-1, XP002736089, ISSN: 1050-2947, DOI: 10.1103/PHYSREVA. 78.022337; [retrieved on Aug. 28, 2008]; the whole document.

Ignacio Garcia-Mata et al:"Quantum phase estimation algorithm in presence of static imperfections", arxiv.org, Cornell University Library, 201 Olin Library Cornell University Ithaca, NY 14853, Nov. 12, 2007 (Nov. 12, 2007), XP080338913, DOI: 10.1140/EPJD/ E2008-00043-1; the whole document.

PCT International Preliminary Report on Patentability issued in International Application No. PCT/US2015/68163, dated Apr. 25, 2018, 23 pages.

* cited by examiner

QUANTUM PHASE ESTIMATION OF MULTIPLE EIGENVALUES

BACKGROUND

This specification relates to quantum computing.

Quantum phase estimation is an important subroutine in many quantum computations. The eigenspectrum of all unitary operators are complex numbers with unit norm. The objective of quantum phase estimation can be to estimate the eigenphases of eigenvectors of a unitary operator. For example, for a quantum state $|\psi\rangle$ that is an eigenstate of a unitary operator $U|\psi\rangle = e^{-i\phi}|\psi\rangle$, an objective of quantum phase estimation is to estimate the value of $\phi$.

SUMMARY

This specification describes technologies for inducing and inferring multiple phases of respective eigenvalues of a unitary operator on a physical quantum state by performing systematic quantum experiments which are then interpreted with a classical mixture model. Individual phases of the eigenvalues of a unitary operator applied to a quantum state may be learned without requiring that the quantum state is an eigenstate of the unitary operator.

In general, one innovative aspect of the subject matter described in this specification can be implemented in methods that include accessing a first quantum register comprising at least one ancilla qubit and a second quantum register comprising one or more qubits, wherein the second quantum register is prepared in a quantum state that is not an eigenstate of a unitary operator operating on the first and second quantum register; performing phase estimation experiments on the first quantum register to determine an expectation value of a state of the ancilla qubit; and based on the determined expectation value of the state of the ancilla qubit, learning phases of the eigenvalues of the unitary operator.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations performing phase estimation experiments on the first quantum register comprises repeatedly measuring the state of an ancilla qubit for each phase estimation experiment.

In other implementations learning phases of the eigenvalues of the unitary operator comprises representing an outcome of a measurement of the state of the ancilla qubit as a binary random variable; based on the binary random variable and the determined expectation value, defining a model that represents the probabilities of the values of the binary random variable; and optimizing the model to learn the phases of the eigenvalues of the unitary operator.

In some implementations the model is a mixture model.

In some implementations the method further comprises providing the learned phases of the eigenvalues of the unitary operator for use in a quantum computation.

In other implementations measuring the state of the ancilla qubit comprises randomly sampling pairs (M, θ), wherein M represents a number of application of the unitary operator and θ represents an angle of rotation applied by a phase gate operating on the first quantum register.

In some cases M is sampled uniformly from $[0, M_{max}]$ with $M_{max}$ a predetermined maximum number of applications of the unitary operator and θ is sampled uniformly from $[0, 2\pi]$.

In some implementations the binary random variable is defined using the determined expectation value of the state of the ancilla qubit.

In other implementations the mixture model that represents the probabilities of the values of the binary random variable is given by $$p(Z_{anc} \mid a_k, \phi_k; M, \theta) = \log \sum_{k=0}^{2^N-1} a_k \left(\frac{1-\cos(M\phi_k+\theta)}{2}\right)^{\delta(Z_{anc}=1)} \left(\frac{1+\cos(M\phi_k+\theta)}{2}\right)^{\delta(Z_{anc}=0)}$$

wherein $Z_{anc}$ represents the value of the state of the ancilla qubit, $a_k = |\langle k|\psi\rangle|^2$ with $|\psi\rangle$ the quantum state and $|k\rangle$ a k-th eigenstate of the unitary operator, $\phi_k$ represents the phase of the eigenvalue corresponding to the k-th eigenstate $|k\rangle$ of the unitary operator, M represents a number of applications of the unitary operator, θ represents an angle of rotation applied by the phase gate, N represents the number of qubits in the second register and δ represents a Kronecker delta.

In further implementations optimizing the model to determine the phases of the eigenvalues of the unitary operator comprises optimizing the mixture model with respect to unique {a, φ}, with the lowest φ within a predetermined distance to the ground state of the quantum state, to determine the phases of the eigenvalues of the unitary operator to required precision.

In some cases the mixture model is estimated using Bayesian inference.

In some implementations the mixture model that represents the probabilities of the values of the binary random variable includes an additional term that represents a source of noise.

In some cases the noise is depolarizing noise.

In some implementations optimizing the model to determine the phases of the eigenvalues of the unitary operator comprises performing an Expectation-Maximisation (EM) algorithm on the model.

The subject matter described in this specification can be implemented in particular ways so as to realize one or more of the following advantages.

Determining quantum phases of multiple eigenvalues of a unitary operator is a computationally difficult, and in some cases intractable, task. Generally, determining the eigenphases $\phi_k$ of multiple eigenvalues of a unitary operator is equivalent to classical inference of multiple Fourier modes given the ability to sample a noisy channel at arbitrary times. Since there are exponentially many eigenphases, this is a computationally inefficient task. Even in some simplified cases, such as when the expectation value of the measurements of the ancilla qubit in which the phases are to be extracted is sparse, the problem of determining the quantum phases is that of estimating a polynomial number of eigenphases $\phi_k$ to n bits of precision. This may be achieved by measuring the ancilla qubit at various points in time and performing a Fourier transform, however this requires that the ancilla qubit be measured at M=1, 2, 4, 8, . . . , $2^{n-1}$ which is also computationally difficult and requires coherent quantum evolution for time that is exponential in n.

A system implementing quantum phase estimation of multiple eigenvalues of a unitary operator enables the resolving of individual eigenphases without sampling at large values of the number of applications M of the unitary operator, unlike methods that required inference of Fourier modes. Thus, the computational resources required to estimate the quantum phases are reduced compared to other systems that require large M circuits.

In addition, a system implementing quantum phase estimation of multiple eigenvalues of a unitary operator using mixture models or nonparametric Bayesian models enables the form of non-trivial noise sources that can contaminate a system to be learned by the models and removed from the system.

A system implementing quantum phase estimation of multiple eigenvalues of a unitary operator may be applicable to more computational tasks compared to systems that require the preparation of an eigenstate of the unitary operator, since the system does not require the preparation of an eigenstate of the unitary operator but rather an arbitrary quantum state.

A system implementing quantum phase estimation of multiple eigenvalues of a unitary operator enables multiple eigenphases of a physical quantum state to be inferred and provided for use in an extensive number of computational applications of industrial value. For example, inferred multiple eigenphases may be used to perform quantum simulations, e.g., quantum algorithms for simulating chemistry and molecular reactions, quantum metrology, spectroscopy, factoring algorithms, order finding algorithms, computations of discrete logarithms, database search algorithms, or solving well-conditioned sparse systems of linear equations.

Furthermore, a system implementing phase estimation of multiple eigenvalues of a unitary operator may facilitate a quantum speed up of computational tasks. This results in an exponential reduction of physical resources required to solve computational tasks compared to the best known classical algorithms. For example, a quantum speed up may be achieved for computational tasks that include Shor's factoring algorithm or quantum simulation algorithms.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an apparatus and method for inducing and inferring multiple phases of respective eigenvalues of a unitary operator on a physical quantum state by performing systematic quantum experiments which are then interpreted with a classical mixture model. The system applies methods for learning probabilistic models on a classical computer that incorporate maximum a posteriori estimation, mixture models and nonparametric Bayesian inference. The system enables individual phases of eigenvalues of a unitary operator applied to a quantum state to be learned, without requiring that the quantum state is an eigenstate of the unitary operator. The system also enables noise sources that can contaminate the signal from which the model learns the multiple phases to be modeled and mitigated.

Example Operating Environment

Figure 1:
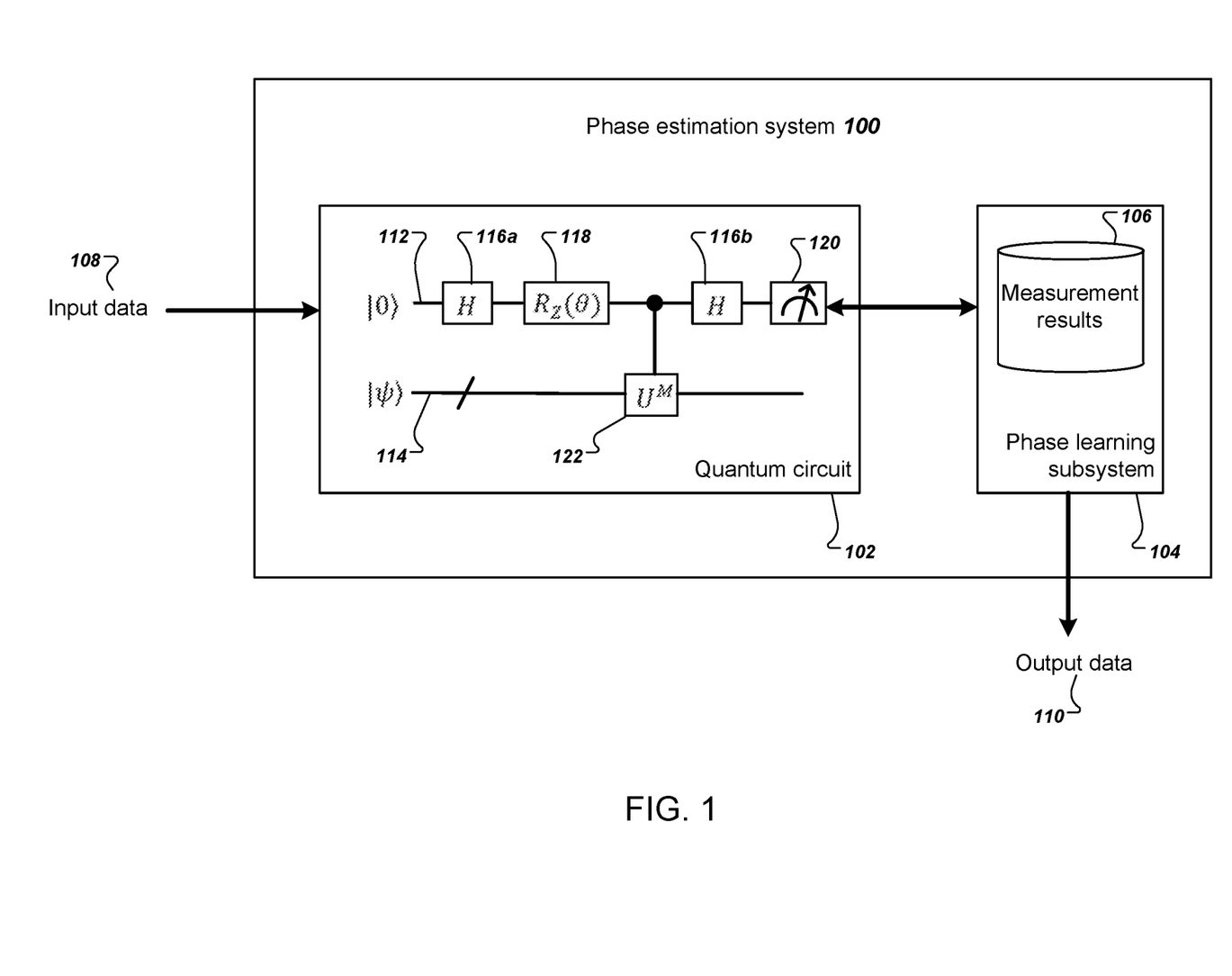
FIG. 1 depicts an example phase estimation system.

FIG. 1 depicts an example phase estimation system 100. The example system 100 is an example of a system implemented as classical or quantum computer programs on one or more classical computers or quantum computing devices in one or more locations, in which the systems, components, and techniques described below can be implemented.

The phase estimation system 100 may receive input data, e.g., input data 108, that includes data specifying quantum circuit parameters and may generate as output data specifying multiple learned phases of the eigenvalues of a unitary operator, e.g. output data 110. Quantum circuit parameters can include parameters relating to a number of times a quantum gate in the quantum circuit is applied or quantum gate parameters. The eigenvalues of the unitary operator specified by the input data 106 are complex numbers with unit norm, e.g., $e^{-i\phi}$, where $\phi$ represents a phase of a respective eigenvalue. Since the unitary operator has more than one eigenvector and corresponding eigenvalue, the learned phases 110 may include multiple learned phases.

The phase estimation system 100 may include a quantum circuit 102, and a phase learning subsystem 104. The quantum circuit 102 may include two quantum registers, e.g., quantum register 112 and quantum register 114. Quantum register 112 may include at least one ancilla qubit, and is initially prepared in a quantum state, e.g., state |0⟩. In some implementations the quantum circuit 102 may include multiple quantum registers that include a single ancilla qubit. Quantum register 114 may include one or more qubits and may be initially prepared in an arbitrary quantum state |ψ⟩. In some implementations the arbitrary quantum state |ψ⟩ is not an eigenstate of the unitary operator specified by the input data 106.

The quantum circuit 102 may further include a set of quantum gates. The set of quantum gates may include at least two Hadamard gates, e.g., Hadamard gates 116a and 116b, a phase gate, e.g., phase gate 118, a measurement operator, e.g., measurement operator 120 and a unitary operator that is specified by the input data 106, e.g., unitary operator 122. The unitary operator 122 acts on both the first quantum register 112 and the second quantum register 114, and may be applied multiple times, e.g., M times. The application of the unitary operator 122 on the ancilla qubit, e.g., on the |1⟩ state of the ancilla qubit, may be experimentally controllable.

In the example shown in FIG. 1, the quantum circuit 102 maps one ancilla qubit to a quantum superposition using Hadamard gate 116a, e.g., quantum circuit 102 maps $|0\rangle \rightarrow (|0\rangle + |1\rangle)/2$, then rotates the ancilla qubit around the Z-axis by angle θ using phase gate 118. The unitary operator 122 is applied to both quantum registers, followed by a second Hadamard gate 116b. Finally a measurement is performed on the ancilla qubit via measurement operator 120 to determine the expectation value of the state of the ancilla qubit. For clarity, FIG. 1 depicts one ancilla qubit, however in some implementations the quantum circuit 102 may include more than one ancilla qubits.

The phase learning subsystem 104 may be configured to perform phase estimation experiments on the quantum circuit 102. To perform a phase estimation experiment on the quantum circuit 102, the phase learning subsystem 104 may repeatedly measure the state of the ancilla qubit using measurement operator 120. The phase learning subsystem 104 may optionally store the results from the measurements of the state of the ancilla qubit in a data store, e.g., measurement results data store 106, for post-processing. For example, the phase learning subsystem 104 may use the results of the measurements of the state of the ancilla qubit to determine an expectation value of the state of the ancilla qubit.

The phase learning subsystem 104 may be configured to represent an outcome of a measurement of the state of the ancilla qubit as a binary random variable, and based on the binary random variable and the determined expectation value of the state of the ancilla qubit, define a model that represents the probabilities of the values of the binary random variable. Defining a model that represents the probabilities of the values of a binary random variable is described in more detail below with reference to FIG. 3.

The phase learning subsystem 104 may be configured to optimize the model that represents the probabilities of the values of the binary random variable to determine the phases of the eigenvalues of the unitary operator. Optimizing a model that represents the probabilities of the values of a binary random variable to determine phases of the eigenvalues of a unitary operator that is specified by input data is described in more detail below with reference to FIG. 3.

The phase learning subsystem 104 may provide the generated output data specifying the learned phases of the eigenvalues of the unitary operator as an output of the phase estimation system 100, e.g., as output data 110. The output data 110 may be provided to a classical or quantum processor for further processing. For example, phase estimation system 100 may be a subsystem of a main system that receives input data 106 and generates output data 110 from input data 106 as part of a subroutine of a computation performed by the main system, e.g., a quantum simulation computation.

Programming the Hardware

Figure 2:
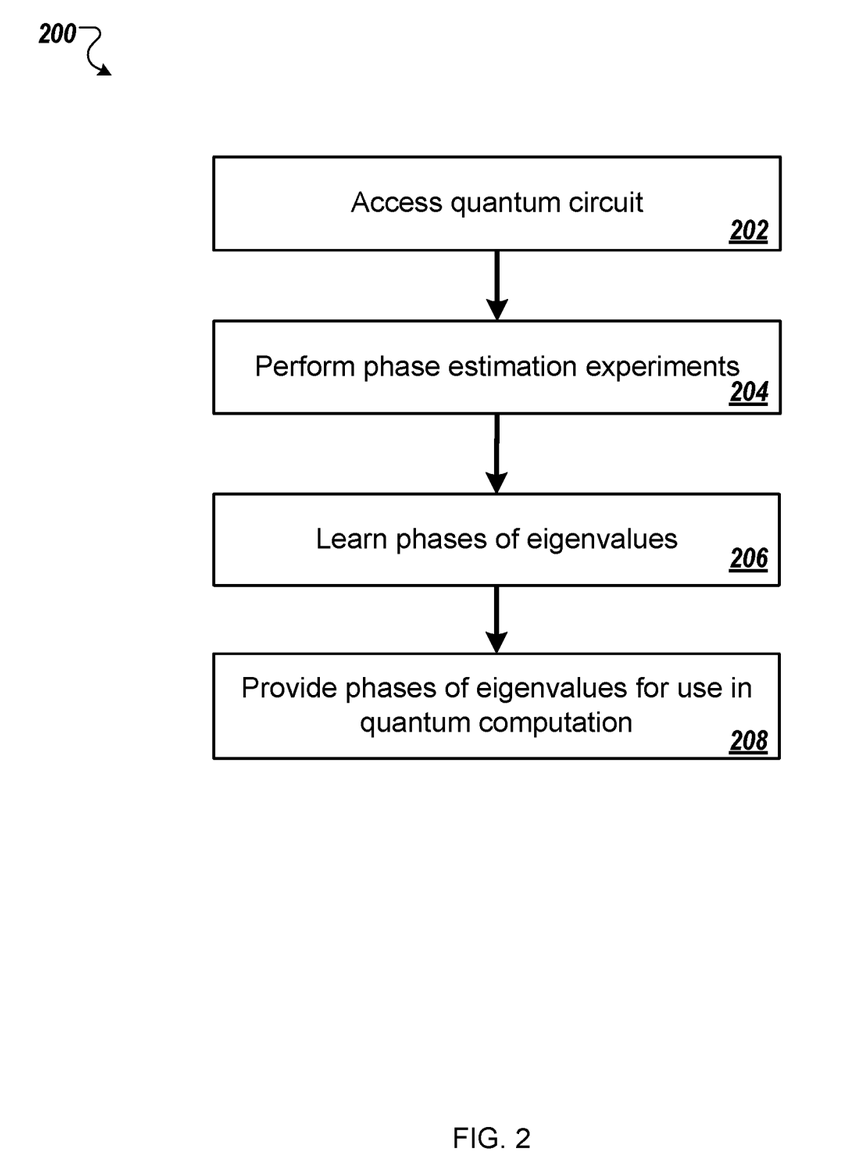
FIG. 2 is a flow diagram of an example process for learning the phases of multiple eigenvalues of a unitary operator.

FIG. 2 is a flowchart of an example process 200 for learning the phases of multiple eigenvalues of a unitary operator. For convenience, the process 200 will be described as being performed by a system of one or more classical or quantum computing devices located in one or more locations. For example, a phase learning system, e.g., the phase learning subsystem 104 of FIG. 1, appropriately programmed in accordance with this specification, can perform the process 200.

The system accesses a quantum circuit, e.g., the quantum circuit 102 of FIG. 1 (step 202). The quantum circuit may include a first quantum register that may include at least one ancilla qubit and a set of quantum gates that may include at least two Hadamard gates, a phase gate rotates the ancilla qubit around the Z-axis by angle θ, a unitary operator U and a measurement operator. The multiple eigenvalues of the unitary operator U are complex numbers with unit norm, e.g., $e^{-i\Phi_k}$ with $|e^{-\Phi_k}|^2=1$. The quantum circuit may also include a second quantum register of one or more qubits. The second quantum register may be prepared in an arbitrary quantum state. The unitary operator U acts on the first and second quantum circuit and may be applied M times.

In some implementations the arbitrary quantum state may not be an eigenstate of the unitary operator, and the action of the unitary operator U on an arbitrary quantum state $|\psi\rangle$ may be given by equation (1) below.

$$U|\psi\rangle = \sum_{k=0}^{2^N-1} \langle k|\psi\rangle e^{-i\phi_k} |k\rangle \quad (1)$$

In equation (1), N represents the number of qubits in the second quantum register and the eigenvalues $\{e^{-i\Phi_k}\}$ and eigenvectors $\{|k\rangle\}$ of U satisfy $U|k\rangle = e^{-i\Phi_k}|k\rangle$ $\forall k$, with $\{\phi_k\}$ defining the phases of the multiple eigenvalues of U.

The system performs phase estimation experiments on the quantum circuit (step 204). The system may repeatedly measure the state of the ancilla qubit for each phase estimation experiment to determine an expectation value of the state of the ancilla qubit. In the case of multiple eigenstates, the expectation value of the state of the ancilla qubit may be given by equation (2) below.

$$\langle Z_{anc}\rangle = -\sum_{k=0}^{2^N-1} a_k \cos(M\phi_k + \theta) \quad (2)$$

In equation (2), $\langle Z_{anc}\rangle$ represents the expectation value of the state of the ancilla qubit, $a_k = |\langle k|\psi\rangle|^2$ with $|\psi\rangle$ the arbitrary quantum state, M represents a number of applications of the unitary operator U, $\phi_k$ represents the phase of the eigenvalue corresponding to the k-th eigenstate $|k\rangle$ of the unitary operator and θ represents an angle of rotation applied by the phase gate.

In some implementations the system may measure the state of the ancilla qubit randomly sampling pairs (M, θ) prior to measuring the state of the ancilla qubit. For example, the system may sample M uniformly from $[0, M_{max}]$ with $M_{max}$ a predetermined maximum number of applications of the unitary operator, e.g., 10 times, and sample θ uniformly from $[0, 2\pi]$. In other examples, the system may draw values of M and θ from special distributions which are designed to provide maximal information based on hypotheses about the values of $a_k$ and $\phi_k$. For instance, it may be of interest to learn the value of $\phi_0$ to high precision, e.g., for applications in quantum chemistry. Thus, the system may draw values for θ from a normal distribution selected so that samples maximize the information learned about the lowest phase. Similar strategies may be implemented in order to inform beneficial choices for M.

The system learns the phases of the eigenvalues of the unitary operator (step 206). For example, the system may use the results from the phase estimation experiments performed with reference to step 204 to learn the phases of the eigenvalues of the unitary operator. Learning the phases of the eigenvalues of a unitary operator using a determined expectation value of a state of an ancilla qubit is described in more detail below with reference to FIG. 3.

The system provides the learned phases of the eigenvalues of the unitary operator for use in a quantum computation (step 208). There may be an extensive number of computational applications that require the learned phases of the eigenvalues of a unitary operator. For example, the learned phases of the eigenvalues of the unitary operator may be used in a quantum algorithm for simulating chemistry, molecular reactions, quantum simulations, quantum metrology, factoring, searching a database, solving well-conditioned sparse systems of linear equations, order finding, or computing discrete logarithms. In some implementations, the learned phases of the eigenvalues of the unitary operator may be provided for use in a quantum algorithm that provides a quantum speed up compared to the best known classical algorithm, such as a factoring algorithm or quantum simulation algorithm.

Classical Inference with Mixture Models

Figure 3:
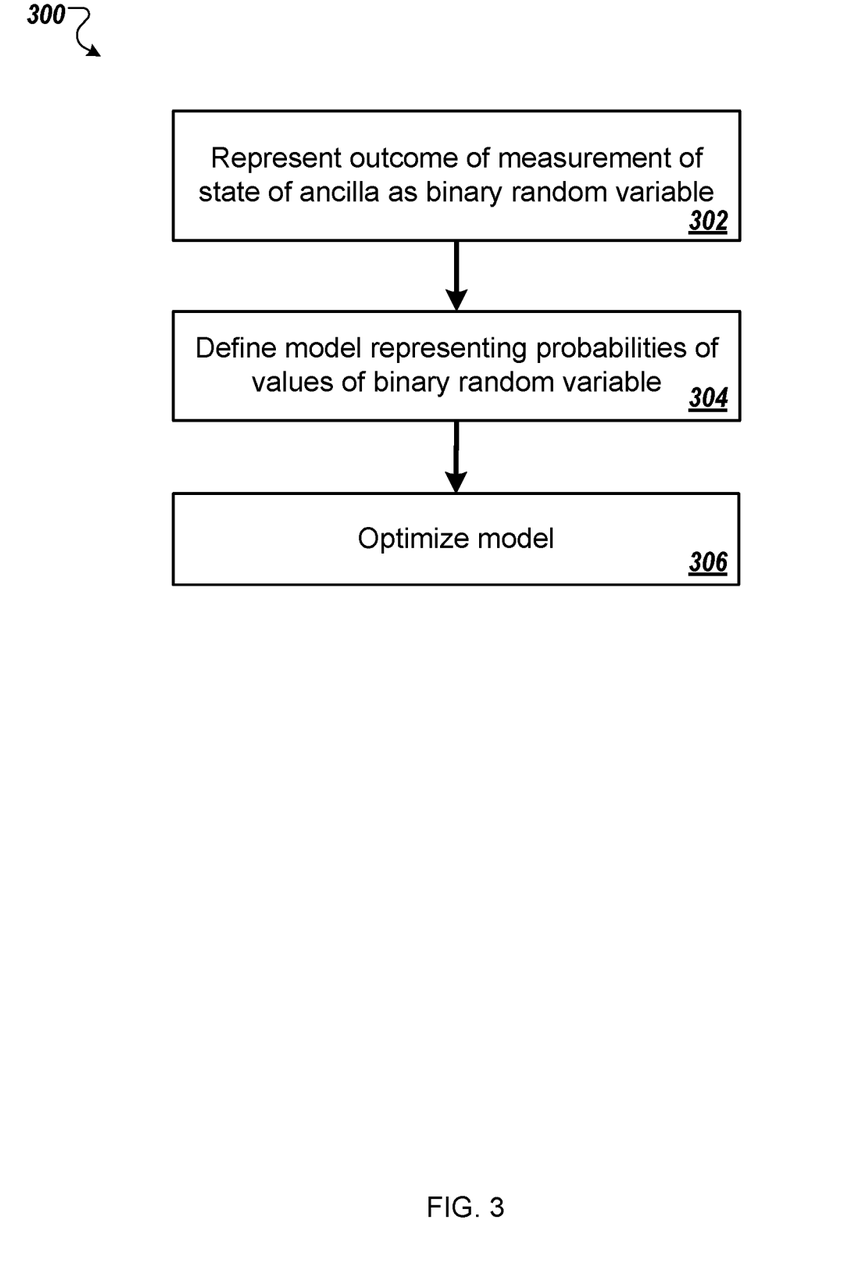
FIG. 3 is a flow diagram of an example process for learning the phases of the eigenvalues of a unitary operator using generated data that includes a determined expectation value of a state of an ancilla qubit.

FIG. 3 is a flowchart of an example process 300 for learning the phases of the eigenvalues of a unitary operator using generated data that includes a determined expectation value of a state of an ancilla qubit. For convenience, the process 300 will be described as being performed by a system of one or more classical computing devices located in one or more locations. For example, a phase learning system, e.g., the phase learning subsystem 104 of FIG. 1, appropriately programmed in accordance with this specification, can perform the process 300.

The system represents an outcome of a measurement of the state of the ancilla qubit as a binary random variable (step 302). Upon measurement, the state of the ancilla qubit may be either positively or negatively aligned with the Z-axis. The state of the ancilla qubit $Z_{anc}$ may therefore be written as a binary random variable of $\{0,1\}$, as given by equation (3) below.

$$p(Z_{anc} = 1) = \frac{1 + \langle Z_{anc} \rangle}{2}, \quad (3)$$

$$p(Z_{anc} = 0) = \frac{1 - \langle Z_{anc} \rangle}{2},$$

In equation (3), $Z_{anc}$ represents the value of the state of the ancilla qubit and $\langle Z_{anc} \rangle$ represents the expectation value of the state of the ancilla qubit, as determined for example at step 204 of FIG. 2 above.

Based on the binary random variable defined in equation (3) and the determined expectation value $\langle Z_{anc} \rangle$, the system defines a model that represents the probabilities of the values of the binary random variable (step 304). In some implementations the model $p(Z_{anc})$ that represents the probabilities of the values of the binary random variable may be a mixture model $p(Z_{anc}|a_k, \phi_k; M, \theta)$. The mixture model may represent the probabilities of the values of the binary random variable and may be given by equation (4) below.

$$p(Z_{anc} | a_k, \phi_k; M, \theta) = \quad (4)$$

$$\log \sum_{k=0}^{2^N-1} a_k \left(\frac{1 - \cos(M\phi_k + \theta)}{2}\right)^{\delta(Z_{anc}=1)} \left(\frac{1 + \cos(M\phi_k + \theta)}{2}\right)^{\delta(Z_{anc}=0)}$$

In equation (4), $Z_{anc}$ represents the value of the state of the ancilla qubit, $a_k = |\langle k|\psi\rangle|^2$ with $|\psi\rangle$ the arbitrary quantum state and $|k\rangle$ a k-th eigenstate of the unitary operator, $\phi_k$ represents the phase of the eigenvalue corresponding to the k-th eigenstate $|k\rangle$ of the unitary operator, M represents a number of applications of the unitary operator, $\theta$ represents an angle of rotation applied by the phase gate, N represents the number of qubits in the second register and $\delta$ represents a Kronecker delta.

In some implementations the model $p(Z_{anc})$ that represents the probabilities of the values of the binary random variable is a mixture model $p(Z_{anc}|a_k, \phi_k; M, \theta)$ that models noise sources and may be given by equation (5) below.

$$p(Z_{anc} | a_k, \phi_k; M, \theta) = \quad (5)$$

$$\log \sum_{k=0}^{2^N-1} \left[ a_k \left(\frac{1 - \cos(M\phi_k + \theta)}{2}\right)^{\delta(Z_{anc}=1)} \left(\frac{1 + \cos(M\phi_k + \theta)}{2}\right)^{\delta(Z_{anc}=0)} + a_{2^N} \right]$$

In equation (5), $Z_{anc}$ represents the value of the state of the ancilla qubit, $a_k = |\langle k|\psi\rangle|^2$ with $|\psi\rangle$ the arbitrary quantum state and $|k\rangle$ a k-th eigenstate of the unitary operator, $\Sigma_{k=0}^{2^N} a_k = 1$, $\phi_k$ represents the phase of the eigenvalue corresponding to the k-th eigenstate $|k\rangle$ of the unitary operator, M represents a number of applications of the unitary operator, $\theta$ represents an angle of rotation applied by the phase gate, N represents the number of qubits in the second register, and $\delta$ represents a Kronecker delta. In some implementations $a_{2^N}$ may represent depolarizing noise. In other implementations $a_{2^N}$ may represent other types of noise.

The system optimizes the model to determine the phases of the eigenvalues of the unitary operator (step 306). The system may optimize the model in order to determine a $a_k$ and $\phi_k$ that maximize the probability $p(Z_{anc}|a_k, \phi_k; M, \theta)$, that is the probability of observing the respective measurement result conditioned on the parameters $a_k$ and $\phi_k$ (where M,$\theta$ have known values).

In some implementations the system may optimize the model to determine the phases of the eigenvalues of the unitary operator by optimizing the mixture model with respect to unique $\{a, \phi\}$, with the lowest $\phi$ within a predetermined distance, e.g., an acceptable distance, to the ground state of the arbitrary quantum state, in order to determine the phases of the eigenvalues of the unitary operator to required precision.

In some implementations the system performs an Expectation-Maximization (EM) algorithm on the mixture model in order to optimize the mixture model to determine the phases of the eigenvalues of the unitary operator. For example, the system may introduce an additional auxiliary variable $q_k$ that satisfies $\tau_{k=0}^{2^N-1} q_k = 1$ such that the mixture model $p(Z_{anc}|a_k, \phi_k; M, \theta)$ may be approximated by equation (6) below.

$$p(Z_{anc} | a_k, \phi_k; M, \theta) \geq \quad (6)$$

$$\sum_{k=0}^{2^N-1} q_k \log a_k - q_k \log q_k + q_k \delta(Z_{anc} = 1) \log\left(\frac{1 - \cos(M\phi_k + \theta)}{2}\right) + q_k \delta(Z_{anc} = 0) \log\left(\frac{1 + \cos(M\phi_k + \theta)}{2}\right)$$

The system may apply an Expectation-Maximization algorithm by alternatively performing an E-step and an M-step. The E-step creates a function for the expectation of a log-likelihood evaluated using a current estimate for the parameters, and may include optimizing $q_k$ by ensuring that the inequality given above in equation (6) may be as tight as possible. The M-step computes the parameters that maximize the expected log-likelihood found at the E-step, and may include optimizing $a_k$ and $\phi_k$ with fixed $q_k$. The updates of $q_k$, $a_k$ and $\phi_k$ may be given by equations (7) and (8) below.

$$q_k \propto a_k \left(\frac{1 - \cos(M\phi_k + \theta)}{2}\right)^{\delta(Z_{anc}=1)} \left(\frac{1 + \cos(M\phi_k + \theta)}{2}\right)^{\delta(Z_{anc}=0)} \quad (7)$$

$$q_k \propto a_k; \phi_k = \underset{\phi}{\mathrm{argmax}}\left(q_k \delta(Z_{anc}=1) \log\left(\frac{1 - \cos(M\phi_k + \theta)}{2}\right) + q_k \delta(Z_{anc}=0) \log\left(\frac{1 + \cos(M\phi_k + \theta)}{2}\right)\right) \quad (8)$$

The Expectation-Maximization algorithm may result in maximum-likelihood estimates of the parameters $a_k$ and $\phi_k$ in the model that represents the probabilities of the values of the binary random variable, i.e., learned phases $\phi_k$ of the eigenvalues of the unitary operator.

In some implementations the mixture model $p(Z_{anc}|a_k, \phi_k; M, \theta)$ may be estimated using nonparametric Bayesian inference. When the size of mixture components is large, the system may introduce a prior on $a_k$. Given that the summation of the $a_k$ from k=0 to $2^N-1$ is equal to 1, in some examples a Dirichlet process D on $a=\{a_1, a_2, \ldots, a_K\}$ may be introduced, e.g., $p(a)=DP(a, \alpha)$. In some implementations other normalized random measures may also be applicable.

In some implementations a prior on $\phi_k$ may be added, and the mixture model $p(Z_{anc}|a_k, \phi_k; M, \theta)$ may be estimated by equation (9) below.

$$p(a_k, \phi_k | Z_{anc}; M, \theta) \propto p(Z_{anc} | a_k, \phi_k; M, \theta) p(a) \prod_k p(\phi_k) \quad (9)$$

In equation (9), $Z_{anc}$ represents the value of the state of the ancilla qubit, $a_k = |\langle k|\psi\rangle|^2$ with $|\psi\rangle$ the quantum state and $|k\rangle$ a k-th eigenstate of the unitary operator, $\phi_k$ represents the phase of the eigenvalue corresponding to the k-th eigenstate $|k\rangle$ of the unitary operator, M represents a number of applications of the unitary operator, $\theta$ represents an angle of rotation applied by the phase gate and a is a prior on $\{a_k\}$.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   accessing a first quantum register comprising at least one ancilla qubit and a second quantum register comprising one or more qubits, wherein the second quantum register is prepared in an arbitrary quantum state;

performing a plurality of phase estimation experiments on the first quantum register, wherein each experiment comprises:
preparing the ancilla qubit in a known quantum state;
operating one or more times on the first quantum register and the second quantum register with a unitary operator; and
subsequent to the operation of the unitary operator, measuring a state of the ancilla qubit;
determining, by a phase learning subsystem, an expectation value of the state of the ancilla qubit based on results of the phase estimation experiments; and
based on the determined expectation value of the state of the ancilla qubit and the measured states of the ancilla qubit, learning, by the phase learning subsystem, phases of the eigenvalues of the unitary operator by optimizing a model representing probabilities of the state of the ancilla qubit,
wherein the model comprises a mixture model that is estimated using non-parametric Bayesian inference.

2. The method of claim 1, wherein each experiment comprises:
applying a first Hadamard gate to the ancilla qubit prior to operating on the first quantum register and the second quantum register with the unitary operator;
applying a phase gate to the ancilla qubit; and
applying a second Hadamard gate the ancilla qubit subsequent to operating on the first quantum register and the second quantum register with the unitary operator.

3. The method of claim 1, wherein learning phases of the eigenvalues of the unitary operator comprises:
representing an outcome of a measurement of the state of the ancilla qubit as a binary random variable; and
based on the binary random variable and the determined expectation value, defining the model that represents the probabilities of the values of the binary random variable.

4. The method of claim 3, wherein the binary random variable is defined using the determined expectation value of the state of the ancilla qubit.

5. The method of claim 3, wherein a mixture model that represents the probabilities of the values of the binary random variable is given by $$p(Z_{anc} \mid a_k, \phi_k; M, \theta) = \log \sum_{k=0}^{2^N-1} a_k \left( \frac{1 - \cos(M\phi_k + \theta)}{2} \right)^{\delta(Z_{anc}=1)} \left( \frac{1 + \cos(M\phi_k + \theta)}{2} \right)^{\delta(Z_{anc}=0)}$$

wherein $Z_{anc}$ represents the value of the state of the ancilla qubit, $a_k = |\langle k | \psi \rangle|^2$ with $|\psi\rangle$ the quantum state and $|k\rangle$ a k-th eigenstate of the unitary operator, $\phi_k$ represents the phase of the eigenvalue corresponding to the k-th eigenstate $|k\rangle$ of the unitary operator, M represents a number of applications of the unitary operator, $\theta$ represents an angle of rotation applied by the phase gate, N represents the number of qubits in the second register and $\delta$ represents a Kronecker delta.

6. The method of claim 5, wherein optimizing the model to determine the phases of the eigenvalues of the unitary operator comprises optimizing the mixture model with respect to unique $\{a, \phi\}$ with the lowest $\phi$ within a predetermined distance to the ground state of the quantum state, to determine the phases of the eigenvalues of the unitary operator to required precision.

7. The method of claim 5, wherein the mixture model that represents the probabilities of the values of the binary random variable includes an additional term that represents a source of noise.

8. The method of claim 7 wherein the noise is depolarizing noise.

9. The method of claim 1, further comprising providing the learned phases of the eigenvalues of the unitary operator for use in a quantum computation.

10. The method of claim 1, wherein the plurality of phase estimation experiments comprises randomly sampling pairs (M, $\theta$), wherein M represents a number of applications of the unitary operator and $\theta$ represents an angle of rotation applied by a phase gate operating on the first quantum register.

11. The method of claim 10, wherein M is sampled uniformly from [0, $M_{max}$] with $M_{max}$ predetermined maximum number of applications of the unitary operator and $\theta$ is sampled uniformly from [0, $2\pi$].

12. The method of claim 1, wherein optimizing the model to determine the phases of the eigenvalues of the unitary operator comprises performing an Expectation-Maximization (EM) algorithm on the model.

13. The method of claim 1, wherein the arbitrary quantum state is not an eigenstate of the unitary operator.

14. The method of claim 1, where the mixture model comprises a sum of terms, each term in the sum of terms comprising probabilities of the state of the ancilla qubit for a respective eigenstate of the unitary operator.

15. An apparatus comprising:
a quantum circuit comprising:
a first quantum register comprising at least one ancilla qubit;
a second quantum register comprising one or more qubits, wherein the second quantum register is prepared in an arbitrary quantum state;
a phase learning system, configured to learn phases of the eigenvalues of a unitary operator,
wherein the apparatus is configured to:
perform a plurality of phase estimation experiments on the first quantum register, wherein each experiment comprises:
preparing the ancilla qubit in a known quantum state;
operating one or more times on the first quantum register and the second quantum register with the unitary operator; and
subsequent to the operation of the unitary operator, measuring a state of the ancilla qubit;
determining, by the phase learning subsystem, an expectation value of the state of the ancilla qubit based on results of the phase estimation experiments; and
based on the determined expectation value of the state of the ancilla qubit and the measured states of the ancilla qubit, learning, by the phase learning subsystem, phases of the eigenvalues of the unitary operator by optimizing a model representing probabilities of the state of the ancilla qubit, wherein the model comprises a mixture model that is estimated using non-parametric Bayesian inference.

16. The apparatus of claim 15, wherein the quantum circuit further comprises at least (i) two Hadamard gates, (ii) a phase gate, and (iii) a measurement operator.

17. The apparatus of claim 16, wherein the quantum circuit is configured to:

apply a first Hadamard gate to the ancilla qubit prior to operating on the first quantum register and the second quantum register with the unitary operator;

apply the phase gate to the ancilla qubit prior to operating on the first quantum register and the second quantum register with the unitary operator; and apply a second Hadamard gate the ancilla qubit subsequent to operating on the first quantum register and the second quantum register with the unitary operator.

18. The apparatus of claim 16, wherein performing the plurality of phase estimation experiments comprises randomly sampling pairs (M, θ), wherein M represents a number of applications of the unitary operator and θ represents an angle of rotation applied by a phase gate operating on the first quantum register.

19. The apparatus of claim 15, wherein the phase learning system is further configured to provide the learned phases of the eigenvalues of the unitary operator for use in a quantum computation.

20. The apparatus of claim 15, wherein the arbitrary quantum state is not an eigenstate of the unitary operator.

* * * * *